(12) United States Patent
Kim

(10) Patent No.: US 9,363,804 B2
(45) Date of Patent: Jun. 7, 2016

(54) METHOD FOR TRANSMITTING UPLINK SIGNAL AND APPARATUS THEREFOR

(75) Inventor: Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 222 days.

(21) Appl. No.: 13/880,909

(22) PCT Filed: Oct. 21, 2011

(86) PCT No.: PCT/KR2011/007897
§ 371 (c)(1),
(2), (4) Date: Apr. 22, 2013

(87) PCT Pub. No.: WO2012/053861
PCT Pub. Date: Apr. 26, 2012

(65) Prior Publication Data
US 2013/0258977 A1 Oct. 3, 2013

Related U.S. Application Data

(60) Provisional application No. 61/405,236, filed on Oct. 21, 2010.

(51) Int. Cl.
*H04W 72/04* (2009.01)
*H04L 5/00* (2006.01)
*H04L 27/26* (2006.01)

(52) U.S. Cl.
CPC ........... *H04W 72/042* (2013.01); *H04L 5/0053* (2013.01); *H04L 27/2602* (2013.01)

(58) Field of Classification Search
None
See application file for complete search history.

(56) References Cited

U.S. PATENT DOCUMENTS

| 8,321,740 B2 * | 11/2012 | Kuo | 714/748 |
|---|---|---|---|
| 2009/0241004 A1 | 9/2009 | Ahn et al. | |
| 2009/0307554 A1 * | 12/2009 | Marinier et al. | 714/748 |
| 2009/0316626 A1 | 12/2009 | Lee et al. | |
| 2010/0034126 A1 * | 2/2010 | Kitazoe et al. | 370/310 |
| 2010/0042884 A1 | 2/2010 | Kuo et al. | |
| 2010/0042888 A1 * | 2/2010 | Kuo | 714/749 |
| 2010/0115367 A1 * | 5/2010 | Hsu | 714/748 |
| 2010/0165939 A1 | 7/2010 | Lin | |

FOREIGN PATENT DOCUMENTS

| JP | 2010-045790 A | 2/2010 |
|---|---|---|
| JP | 2010-158000 A | 7/2010 |
| KR | 10-2010-0002114 A | 1/2010 |

* cited by examiner

*Primary Examiner* — Brandon Renner
*Assistant Examiner* — Manuel Rangel
(74) *Attorney, Agent, or Firm* — Birch, Stewart, Kolasch & Birch, LLP

(57) ABSTRACT

The present invention relates to a wireless communication system. Specifically, the present invention relates to a method of transmitting an uplink signal in a state in which a PUSCH sub-frame bundling mode is set, including the steps of: receiving a first PDCCH signal having an uplink grant through a first downlink sub-frame; receiving a second PDCCH signal having an uplink grant through a second downlink sub-frame: and one or more continuous uplink sub-frames of a predetermined size transmitting a PUSCH signal corresponding to the second PDCCH signal when a value corresponding to an interval between the first downlink sub-frame and the second downlink sub-frame is smaller than a bundling size set through a higher layer, wherein the predetermined size is set as the size smaller than the bundling size, and an apparatus therefor.

6 Claims, 15 Drawing Sheets

METHOD FOR TRANSMITTING UPLINK SIGNAL AND APPARATUS THEREFOR

CROSS REFERENCE TO RELATED APPLICATIONS

This application is the National Phase of PCT/KR2011/007897 filed on Oct. 21, 2011, which claims priority under 35 U.S.C. 119(e) to U.S. Provisional Application No. 61/405,236 filed on Oct. 21, 2010, all of which are hereby expressly incorporated by reference into the present application.

TECHNICAL FIELD

The present invention relates to a wireless communication, and more particularly, to a method of transmitting an uplink signal and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of transmitting a PUSCH and apparatus therefor. In particular, the object of the present invention is to provide a method of efficiently performing a subframe bundling and apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of transmitting an uplink signal, which is transmitted by a user equipment in a state that a PUSCH (physical uplink shared channel) subframe bundling mode is set in a wireless communication system, according to one embodiment of the present invention may include the steps of receiving a $1^{st}$ PDCCH (physical downlink control channel) signal having an uplink grant via a $1^{st}$ downlink subframe, receiving a $2^{nd}$ PDCCH (physical downlink control channel) signal having an uplink grant via a $2^{nd}$ downlink subframe, and if a value corresponding to an interval between the $1^{st}$ downlink subframe and the $2^{nd}$ downlink subframe is smaller than a bundling size set up by a higher layer, transmitting a PUSCH signal corresponding to the $2^{nd}$ PDCCH signal in at least one contiguous uplink subframe corresponding to a prescribed size, wherein the prescribed size is set smaller than the bundling size.

To further achieve these and other advantages and in accordance with the purpose of the present invention, a user equipment, which is configured to transmit an uplink signal in a state that a PUSCH (physical uplink shared channel) subframe bundling mode is set in a wireless communication system, according to another embodiment of the present invention may include an RF (radio frequency) unit and a processor configured to receive a $1^{st}$ PDCCH (physical downlink control channel) signal having an uplink grant via a $1^{st}$ downlink subframe, the processor configured to receive a $2^{nd}$ PDCCH (physical downlink control channel) signal having an uplink grant via a $2^{nd}$ downlink subframe, the processor, if a value corresponding to an interval between the $1^{st}$ downlink subframe and the $2^{nd}$ downlink subframe is smaller than a bundling size set up by a higher layer, configured to transmit a PUSCH signal corresponding to the $2^{nd}$ PDCCH signal in at least one contiguous uplink subframe corresponding to a prescribed size, wherein the prescribed size is set smaller than the bundling size.

Preferably, if the PUSCH signal corresponding to the $1^{st}$ PDCCH and the PUSCH signal corresponding to the $2^{nd}$ PDCCH are scheduled to be transmitted via a same uplink signal, a transmission of the PUSCH signal corresponding to the $1^{st}$ PDCCH is dropped.

Preferably, the prescribed size is temporarily applied to a transmission of the PUSCH signal corresponding to the $2^{nd}$ PDCCH only.

Preferably, if the value corresponding to the interval between the $1^{st}$ downlink subframe and the $2^{nd}$ downlink subframe is smaller than the bundling size, the PUSCH subframe bundling mode is released.

Advantageous Effects

According to embodiments of the present invention, PUSCH can be efficiently transmitted in a wireless communication system. In particular, a subframe bundling can be efficiently performed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

First of all, the following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

For clarity, the following description mainly concerns 3GPP LTE/LTE-A, by which the present invention may be non-limited.

Figure 1:
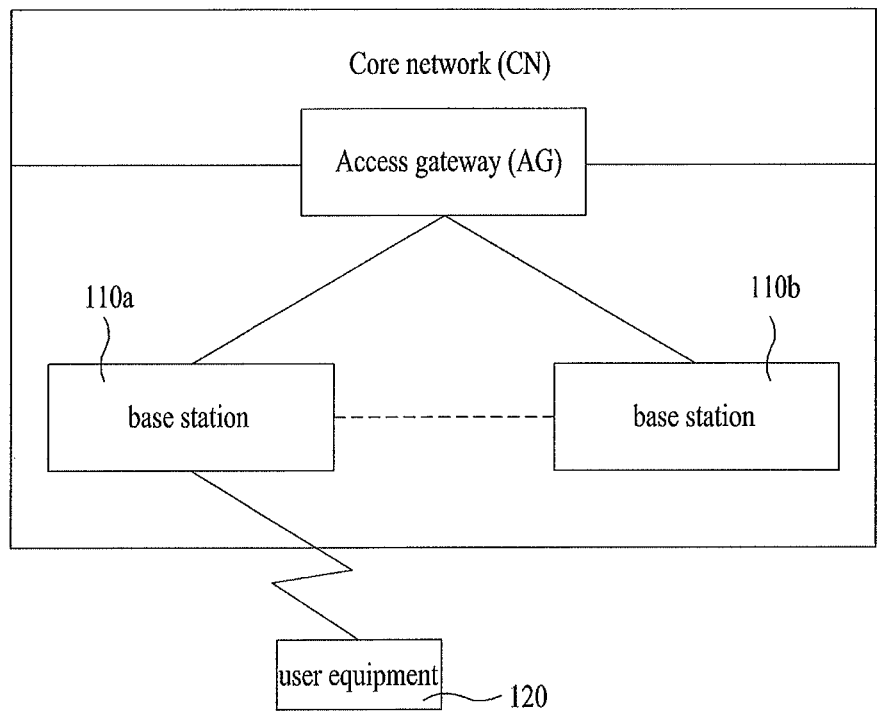
FIG. 1 shows one example of a network structure of E-UMTS (evolved universal mobile telecommunications system).

FIG. 1 shows one example of a network structure of E-UMTS (evolved universal mobile telecommunications system). E-UMTS (evolved universal mobile telecommunications system) is the system evolved from WCDMA UMTS and its ongoing standardization is performed by 3GPP. Generally, E-UMTS can be called LTE (long term evolution) system. For the details of the technical specifications of UMTS and E-UMTS, Release 7 and Release 8 of '3$^{rd}$ Generation Partnership Project: Technical Specification Group Radio. Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service. At least one or more cells (e.g., 3 cells) exist in one base station. The cell is set to one of bandwidths including 1.4 MHz, 3 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency domain for transmitting data to the corresponding user equipment, coding, data size, HARQ (Hybrid Automatic Repeat and reQuest) relevant information and the like. And, the base station sends uplink scheduling information on uplink (UL) data to a corresponding user equipment to inform the corresponding user equipment of time/frequency domain available for the corresponding user equipment, coding, data size, HARQ relevant information and the like. An interface for a user traffic transmission or a control traffic transmission is usable between base stations. A core network (CN) can consist of an access gateway (AG), a network node for user registration of a user equipment and the like. The AG manages mobility of the user equipment by a unit of TA (tracking area) including a plurality of cells.

Figure 2:
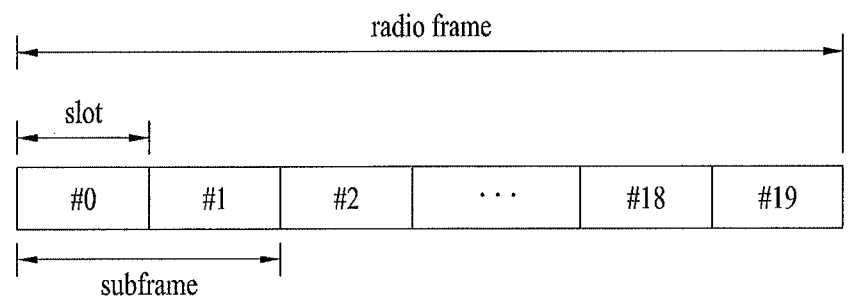
FIG. 2 shows one example of a structure of a radio frame used by E-UMTS.

FIG. 2 is a diagram for one example of a structure of a radio frame used by E-UMTS system.

Referring to FIG. 2, an E-UMTS system uses a radio frame of 10 ms. And, one radio frame includes 10 subframes. Each of the subframes includes 2 slots contiguous with each other. One slot may have a length of 0.5 ms and may be constructed with a plurality of symbols (e.g., OFDM (orthogonal frequency division multiplexing) symbols, SC-FDMA (single carrier frequency division multiple access) symbols).

Figure 3:
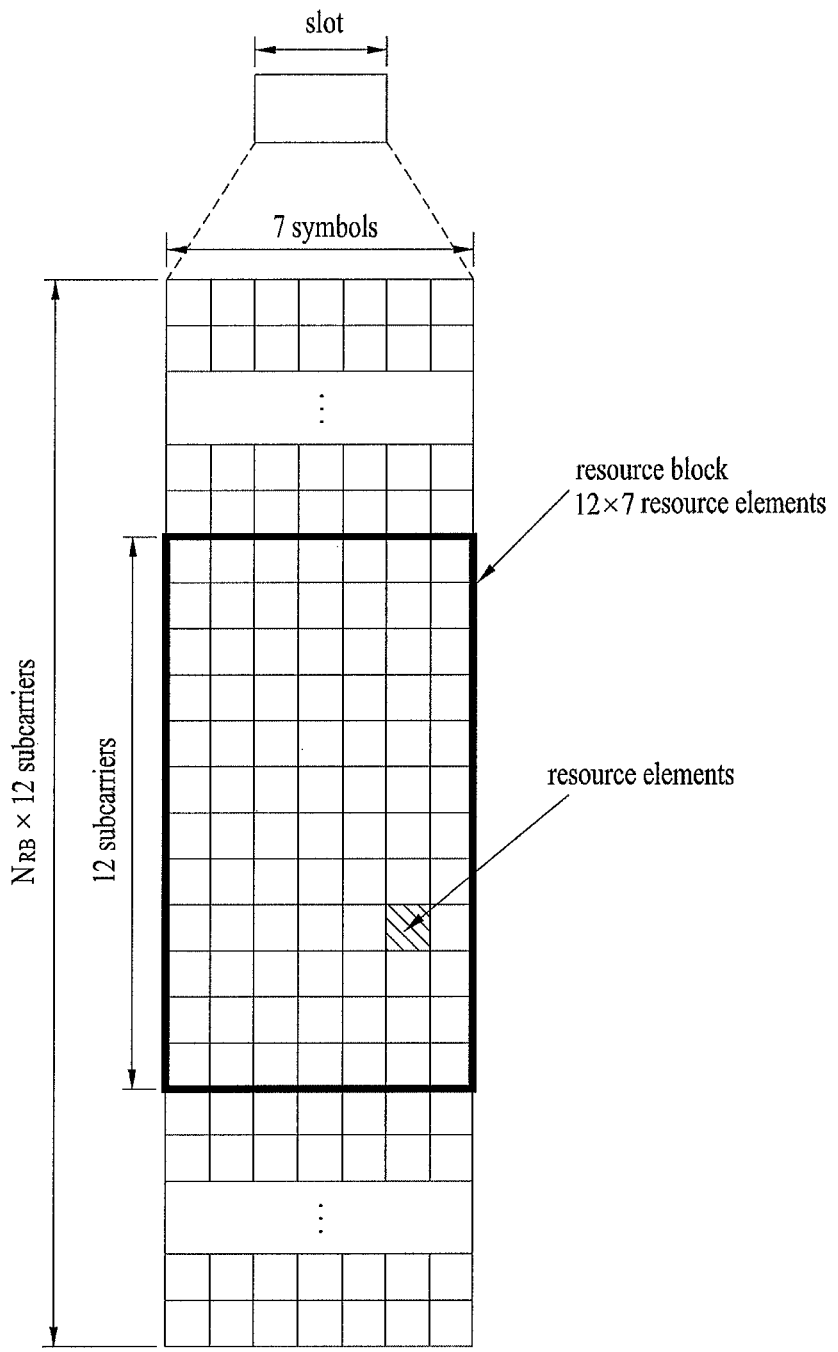
FIG. 3 shows one example of a resource grid of a radio frame.

FIG. 3 is a diagram for one example of a resource grid of a lot.

Referring to FIG. 3, a slot includes a plurality of OFDM symbols or SC-FDMA symbols and also includes a plurality of resource blocks (RBs) in frequency domain. On resource block includes 12×6 (or 12×7) resource elements (REs). The number $N_{RB}$ of RBs included in a time slot depends on a transmission bandwidth configured in a cell. Each box in the resource grid indicates a minimum resource defined by one symbol and one subcarrier, which is called a resource element (RE). FIG. 3 exemplarily shows that a time slot and a resource block include 7 symbols and 12 subcarriers, respectively, by which the present invention may be non-limited. For instance, the number of symbols included in a slot may be variable depending on a length of a cyclic prefix (hereinafter abbreviated CP).

Figure 4:
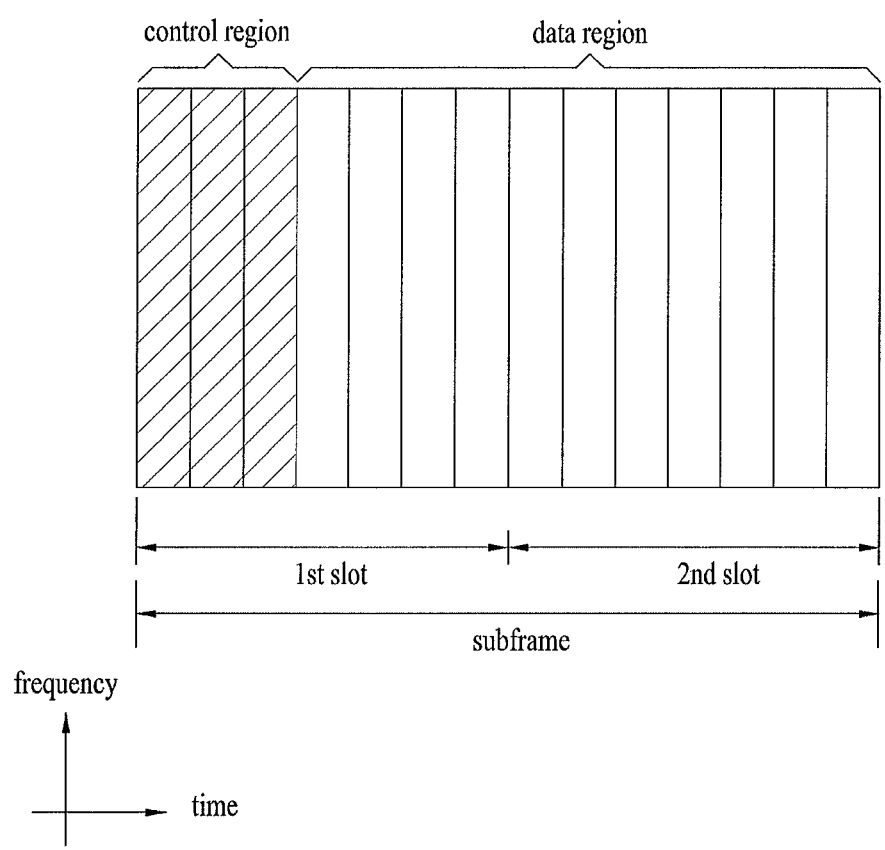
FIG. 4 shows one example of a structure of a downlink (hereinafter abbreviated DL) subframe.

FIG. 4 is a diagram for a structure of a DL subframe.

Referring to FIG. 4, in a DL subframe of LTE system, L1/L2 control region and data region are multiplexed together by TDM (time division multiplexing). The L1/L2 control region is configured with $1^{st}$ n (e.g., 3 or 4) OFDM symbols of a subframe and the rest of the OFDM symbols are used as the data region. The L1/L2 control region includes PDCCH (physical downlink control channel) configured to carry DL control information and the data region includes PDSCH (physical downlink shared channel) as a DL data channel. In order to receive a DL signal, a user equipment reads DL scheduling information from PDCCH and then receives DL data on PDSCH using resource allocation information indicated by the DL scheduling information. The resource (i.e., PDSCH) scheduled for the user equipment is allocated by a resource block unit or a resource block group unit.

PDCCH informs a user equipment of information related to resource allocation of transport channels PCH (paging channel) and DL-SCH (downlink-shared channel), UL scheduling grant, HARQ information and the like. The information carried on PDCCH is commonly called Downlink control information (DCI). In accordance with control information, there are various kinds of DCI formats.

Table 1 shows DCI format 0 for UL scheduling.

TABLE 1

| Field | Bits | Comment |
| --- | --- | --- |
| Format | 1 | Uplink grant or downlink assignment |
| Hopping flag | 1 | Frequency hopping on/off |
| RB assignment | 7$^{a)}$ | Resource block assigned for PUSCH |

TABLE 1-continued

| Field | Bits | Comment |
| --- | --- | --- |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | To request CQI feedback through PUSCH |
| RNTI/CRC | 16 | 16 bit RNTI implicitly encoded in CRC |
| Padding | 1 | To ensure format 0 matches format 1A in size |
| Total | 38 | — |

MCS: Modulation and Coding Scheme
TPC: Transmit Power Control
RNTI: Radio Network Temporary Identifier)
CRC: Cyclic Redundancy Check It may be able to identify whether PDCCH is transmitted to a specific user equipment using RNTI. For instance, assume that PDCCH is CRC masked with RNTI named 'A' and that the PDCCH carries UL resource allocation information B (e.g., frequency position) and transmission format information C (e.g., transport block size, modulation scheme, coding information, etc.). In this case, a user equipment in a cell monitors PDCCH using RNTI of its own and the user equipment having the RNTI A performs a UL transmission in accordance with the informations B and C obtained from the PDCCH.

Figure 5:
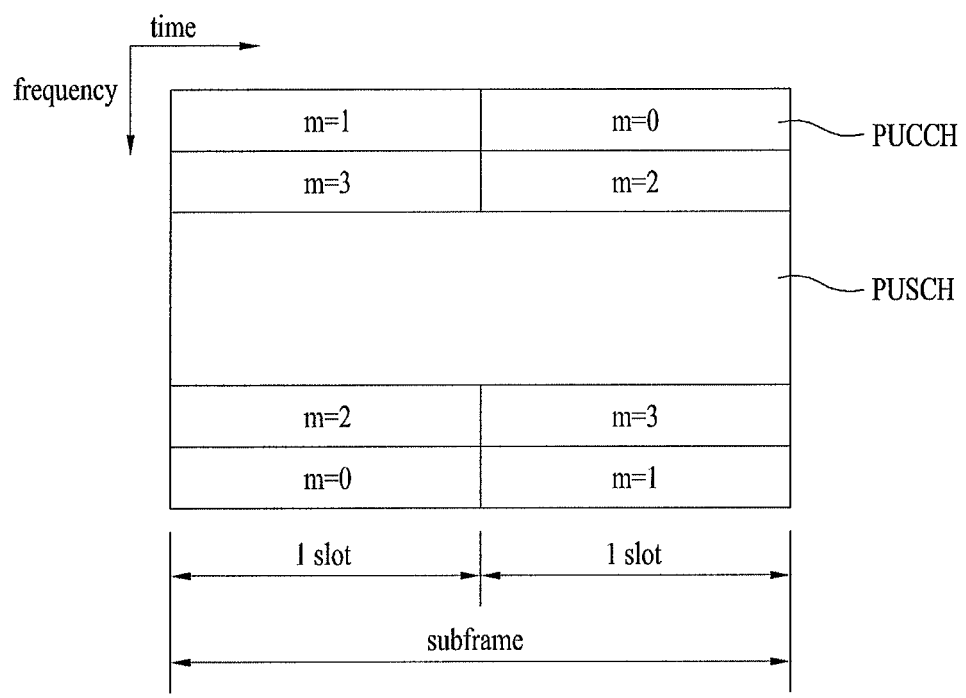
FIG. 5 shows one example of a structure of an uplink (hereinafter abbreviated UL) subframe.

FIG. 5 is a diagram for one example of a structure of a UL subframe used by LTE.

Referring to FIG. 5, a UL frame includes a plurality of slots (e.g., 2 slots). Each of the slots may include a different number of SC-FDMA symbols in accordance with a CP length. The UL subframe may be divided into a data region and a control region in frequency domain. The data region includes PUSCH and is used to transmit such a data signal as an audio and the like. The control region includes PUCCH and is used to transmit UL control information (UCI). The PUCCH includes an RB pair situated at both ends of the data region and performs hopping over the boundary of a slot. The UL control information includes SR (scheduling request) to request an uplink resource, HARQ ACK/NACK (hybrid automatic repeat and request acknowledgement/negative acknowledgement) for DL data packet, DL channel (state) information and the like. In particular, the DL channel (state) information may include PMI (precoding matrix indicator), RI (rank indicator) and CQI (channel quality indicator).

Figure 6:
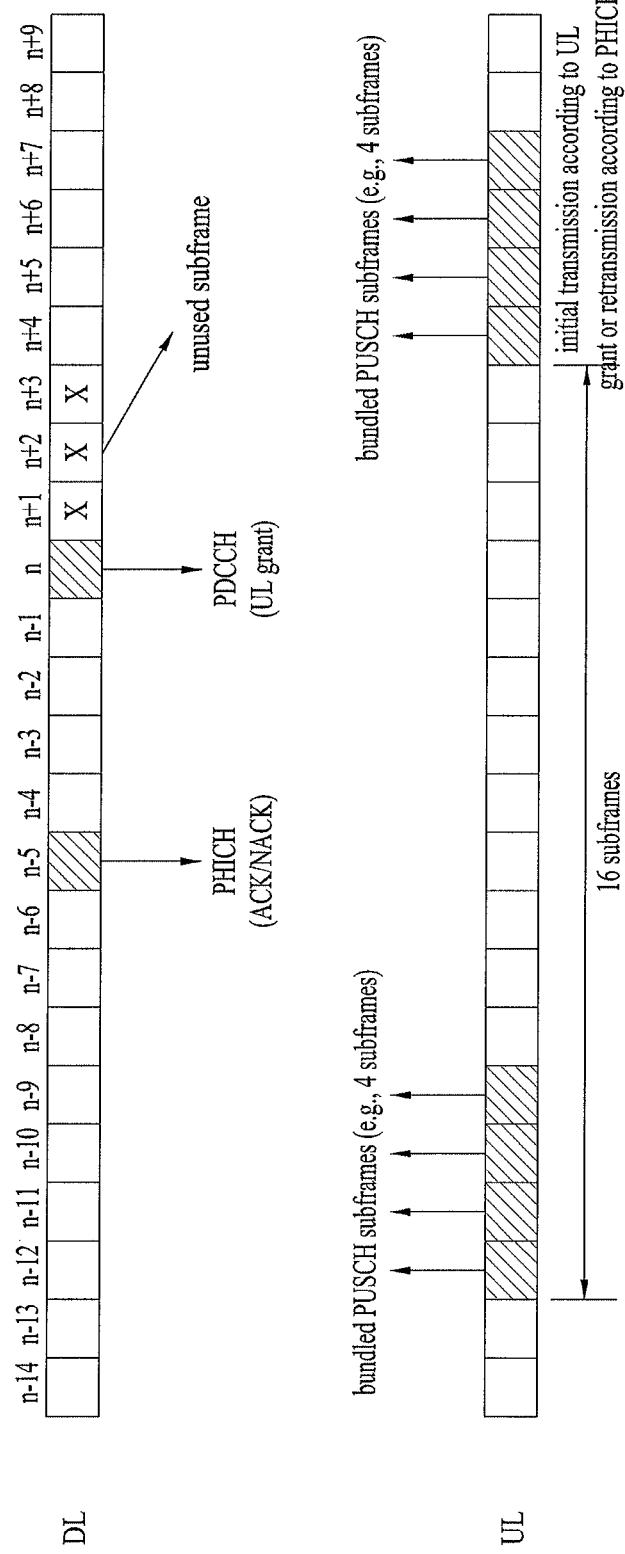
FIG. 6 shows one example of performing a subframe bundling according to a related art.

FIG. 6 shows one example of performing a PUSCH subframe bundling (briefly, a subframe bundling) according to a related art.

Subframe bundling is configured by a higher layer and may be enabled or disabled UE-specifically. If the subframe bundling is enabled, a user equipment transmits PUSCH in each of bundled subframes. Information (e.g., UL-SCH transport block) to be transmitted in the bundled subframe is coded together and can be divided into N contiguous subframes. In this case, the N indicates a bundling size. The N is provided by a higher layer and is effective until the subframe bundling is disabled by the higher layer. A PUSCH signal transmitted in each of the bundled subframes is self-decodable. In particular, even if a base station receives a PUSCH signal in one of the N subframes only, it is able to decode the PUSCH signal (e.g., UL-SCH transport block). In case of HARQ-ARQ operation, a codeword for the UL-SCH transport block is categorized into several redundancy versions (RV). When the subframe bundling is applied, the RV transmitted in each of the bundled subframes may be given identically or differently. When a backhaul link is taken into consideration in a communication system including a relay node, it may be able to control the subframe bundling to apply to a subframe #4/#5 or a subframe #0/#9.

FIG. 6 shows one example of a case that a bundling size N is 4. A PUSCH transmission may include an initial transmission by UL grant PDCCH or a retransmission according to PHICH (i.e., ACK/NACK). Subframe bundling is applied to both PUSCH initial transmission and retransmission. Since the bundling size is 4, a user equipment transmits PUSCH in 4 contiguous subframes each time. Meanwhile, when a UL grant PDCCH is present in a DL subframe #n, DL subframes #(n+1) to #(n+3) are not available for a UL grant PDCCH transmission.

In case of FDD (frequency division duplex), if a PDCCH (i.e., a UL grant PDCCH) for a PUSCH scheduling for itself is detected from a subframe #(n−4), the user equipment transmits a corresponding PUSCH in a subframe #n. If the subframe bundling is enabled, the user equipment transmits the PUSCH corresponding to the UL grant PDCCH detected from the subframe #(n−4) in the subframes #n, #(n+1), . . . , and #(n+N−1). During the subframe bundling, the user equipment does not transmit other signals in the subframes #n, #(n+1), . . . , and #(n+N−1). In case of TDD, if a UL grant PDCCH is detected from the subframe(s) # (n−4), the user equipment transmits a corresponding PUSCH in the subframe #n. In this case, it is k∈K. And, the K is defined in consideration of a TDD frame structure and a location relation of the subframe #n. If the subframe bundling is enabled, the user equipment transmits PUSCH corresponding to the UL grant PDCCH detected from the subframe(s) #(n−k) in a UL subframe #n and N UL subframes (named subframes $n_0$, $n_1$, . . . , and $n_{N-1}$) next to the UL subframe #n. During the subframe bundling, the user equipment does not transmit other signals in the subframes $n_0$, $n_1$, . . . , and $n_{N-1}$.

A subframe bundling mode is introduced as a sort of a method for power-restricted user equipments to reliably transmit PUSCH to a base station. Yet, a conventional subframe bundling operation results in waste of DL and UL resources. Referring to FIG. 6, if the number (i.e., a bundling size) of the bundled PUSCH subframes is 4, it is unable to perform a UL scheduling on a corresponding user equipment in DL subframes #(n+1) to #(n+3). Hence, the bigger a subframe bundling size gets, the smaller the number of available subframes becomes.

If it is unnecessary to perform a subframe bundling due to a change (e.g., a movement of a user equipment, a change of environment, etc.) of a channel status, it may be able to cancel the configuration of subframe bundling for a corresponding user equipment. Yet, in case that such an equipment as a user equipment, a relay node and the like has mobility, a variation of a radio channel in accordance with time relatively increases. In this case, it is difficult to properly cope with the channel variation using the semi-statically configured subframe bundling enabling/disabling method. Moreover, if it is necessary to configure/cancel a PUSCH transmission mode appropriate for all user equipments in response to a channel variation and the like, the load put on a scheduler increases considerably. Therefore, as a preferable/realistic operating method, every user equipment or relay node belonging to a cell may consider operating in the same PUSCH transmission mode.

Embodiment

The present invention proposes a method of adaptively performing a subframe bundling for PUSCH transmission (such bundling shall be briefly named a subframe bundling) in response to a channel status and the like. For instance, as a channel status or the like gets better, if it is unnecessary to use a subframe bundling, the present invention proposes a method of allowing a new PUSCH transmission to start together with an already-configured subframe bundling operation. In particular, the start of the new PUSCH transmission may force a previously configured subframe bundling size to be restricted or may disable to deactivate a following subframe bundling. Moreover, in case that two PUSCHs overlap with each other in the same UL subframe due to the subframe bundling, it may be able to simultaneously transmit the two PUSCHs. Alternatively, in case that two PUSCHs overlap with each other, it may be able to drop a specific PUSCH transmission. In particular, if it is necessary to transmit a plurality of PUSCHs in a single subframe due to a subframe bundling, a user equipment may not transmit some of the PUSCHs.

One embodiment of the present invention is described in detail with reference to the accompanying drawings as follows. In the following description, assume that a subframe bundling mode for a PUSCH transmission is configured by a higher layer signaling. In particular, on the assumption that a subframe bundling is primarily configured by a higher layer, the present invention mainly relates to a method of performing the subframe bundling adaptively in response to a channel status and the like if the subframe bundling is enabled. Accordingly, the present invention may be understood as a method of 2-step subframe bundling adjustments. The higher layer signaling may include BCH (Broadcast Channel) signaling, RRC (Radio Resource Control) signaling, MAC (Medium Access Control) signaling and the like. The subframe bundling may be signaled UE-specifically, UE group-specifically, or cell-specifically. The subframe bundling may be explicitly designated or may be confirmed from parameters related to a cell size and the like indirectly/implicitly.

Condition for adaptively performing a subframe bundling in response to a channel status and the like may include a case that a plurality of PUSCH transmissions are scheduled in the same UL subframe. Equivalently, the above-mentioned condition may include a case that an interval between a UL subframe for initially transmitting a previous PUSCH and a UL subframe for initially transmitting a next PUSCH or a value corresponding to the interval is smaller than a bundling size. And, the above-mentioned condition may include a case that an interval between a DL subframe, from which a PDCCH corresponding to a previous PUSCH is detected, and a DL subframe, from which a PDCCH corresponding to a next PUSCH is detected, or a value corresponding to the interval is smaller than a bundling size.

Regarding the following description with reference to the accompanying drawings, for example, assume a case that a difference (hereinafter named a PUSCH timing) between a DL subframe for a UL grant PDCCH reception and a UL subframe for a PUSCH transmission in synchronous HARQ (hybrid automatic repeat and request) includes 4 subframes. For another example, the PUSCH timing may have different values (e.g., 3 subframes, 5 subframes, 6 subframes, etc.). For clarity of the following description, for example, a user equipment detects a UL grant PDCCH and then performs a PUSCH initial transmission corresponding to the detection. Moreover, as mentioned in the foregoing description with reference to FIG. 6, the PUSCH subframe bundling may apply to the case of a PUSCH retransmission. And, in the following description, UL grant PDCCH may be replaced by PHICH entirely or in part.

While a subframe bundling mode (e.g., a bundling size=N) is set, even if a UL grant PDCCH is transmitted in a DL subframe #n, a communication system according to an embodiment of the present invention is able to transmit a new UL grant PDCCH in a DL subframe #(n+a) [1≤a≤(N−1)]. If the new UL grant PDCCH is in the DL subframe #(n+a), a corresponding PUSCH is scheduled to be transmitted in a UL subframe #(n+a+4) and a UL subframe next to the UL subframe #(n+a+4). Hence, a previous PUSCH transmission and a new PUSCH transmission may be scheduled in the same subframe. In the following description, when a plurality of PUSCH transmissions are scheduled in the same UL subframe, a user equipment operation is explained.

Method 1. Simultaneously Transmitting a Plurality of PUSCHs

A plurality of PUSCHs may be entirely transmitted using PUSCH resources in the same UL subframe, respectively. In case that a plurality of PUSCHs are simultaneously transmitted in a UL subframe, the relevant problems may be causes as follows.

Limited user equipment transmission power

Reduced advantages obtained from a single frequency transmission scheme (e.g., increase of CM (cubic metric) value)

Solutions for the above problems are additionally described as follows.

First of all, regarding the restricted user equipment power, if there is no surplus power headroom according to a transmission power of a user equipment, it is difficult to initiate a new transmission in addition. Hence, a base station is able to transmit a new UL grant PDCCH to a user equipment having a surplus power headroom only. Meanwhile, although a user equipment does not always have a surplus power headroom, if a power headroom changes dynamically, a power headroom value dynamically changes in response to the changing power headroom. In order to correctly utilize a corresponding surplus power, a base station is able to transmit a new UL grant PDCCH to the corresponding user equipment if necessary.

To this end, it is necessary to well design a criterion for when and how a subframe bundling mode is set. For instance, if a state/quality value (e.g., SINR (signal to interference+noise ratio)) of a channel is greater than S1, it may be able to set a subframe bundling to be enabled. In this case, if the S1 value is set to a very small value, the subframe bundling shall be enabled for most of the cases. In this case, as mentioned in the foregoing description with reference to FIG. 6, it is impossible to perform a new UL grant PDCCH transmission in subframes #(n+1) to #(n+3). Hence, resources may be considerably wasted. On the contrary, if the S1 value is set to a very big value, the subframe bundling applicable cases are considerably limited to considerably degrade PUSCH decoding performance. Hence, a subframe bundling mode is set by selecting an S1 value appropriately and a new UL grant PDCCH is transmitted in subframes #(n+1) to #(n+3) in consideration of a surplus power of a user equipment in response to a dynamic channel change according to time/frequency, whereby efficiency in using resources can be raised.

Meanwhile, while a user equipment is performing a subframe bundling, if the user equipment receives a new UL grant PDCCH and needs to transmit corresponding PUSCH simultaneously, a power for simultaneously transmitting a plurality of PUSCHs (e.g., a previous PUSCH and a new PUSCH) may not be sufficient. For instance, a sum of two PUSCH transmission powers determined by a transmission power control may exceed a transmission power limit. In this case, the limited transmission power needs to be appropriately distributed to two PUSCHs. To this end, it may be able to consider three kinds of schemes as follows.

1st power distribution scheme: Equally distribute a limit of a transmission power to two PUSCHs (or distribute the limit at an appropriately given ratio)

2nd power distribution scheme: Distribute a power, which remains after allocating a power to a repeated PUSCH preferentially, to a new PUSCH 3rd power distribution scheme: Distribute a power, which remains after allocating a power to a new PUSCH preferentially, to a repeated PUSCH According to the 1st power distribution scheme, two kinds of PUSCHs are equally treated (or fairly in proportion to an appropriate ratio) and an appropriate power is possibly allocated to each of the two PUSCHs. On the other hand, according to the 2nd or 3rd power distribution scheme, an absolute priority is given to one of two PUSCHs in order to transmit one PUSCH with a stable power at least.

In the following description, a problem of damaging a single frequency transmission scheme is explained. Currently, LTE-A (LTE-Advanced) system allows a UL single frequency transmission to be dropped if necessary. Namely, a multi-frequency transmission is allowed by the LTE-A system. For instance, as a channel status is very good, if it is determined that performance degradation due to degradation of CM characteristics can be complemented, multi-channel simultaneous transmission may be applicable. Hence, it is possible to simultaneously transmit a plurality of PUSCHs (e.g., 2 PUSCHs). If a new PUSCH transmission is allowed, it means that a channel status is good. In this case, PUSCH simultaneously transmission may be possible as well. Of course, it is preferable for a base station or a relay node to determine whether to perform a new transmission in consideration of simultaneous transmission.

Method 2. Drop or Stop Transmission of Some PUSCHs

While a subframe bundling is set, if a plurality of PUSCHs are scheduled to be transmitted in the same subframe, it may be able to consider a method of dropping, stopping or suspending transmission of some of the PUSCHs. For clarity, assume a case that two PUSCH transmissions are scheduled to be performed in the same UL subframe. In this case, if a plurality of PUSCH transmissions are scheduled to overlap with each other, it may be able to perform a procedure for dropping, stopping or suspending a previous PUSCH transmission in the corresponding UL subframe. If the previous PUSCH transmission is abandoned, an initial transmission of a new PUSCH may be performed using resources (e.g., time-frequency resource, modulation and coding scheme (MCS), etc.) for the previous PUSCH. Through this, a user is able to send a confirmation, which indicates that the user equipment fully understands the PUSCH overlapping schedule made by a base station, to the base station [UE-to-eNB confirmation]. Alternatively, if there is a new PUSCH transmission, it may be able to perform a procedure for dropping, stopping or suspending the new PUSCH transmission in the corresponding UL subframe by regarding that a channel status becomes better or by giving priority to a previous PUSCH.

Method 3. Changing a Subframe Bundling Mode

In case that PUSCH transmissions are scheduled to overlap by a base station, it may be able to change a subframe bundling mode together with the above-described method 1 and/or the above-described method 2. The change of the subframe bundling mode may include a reduction of a subframe bundling size, an interruption of the subframe bundling mode and the like. In case that PUSCHs are scheduled to overlap with each other in the same UL subframe, the change of the subframe bundling mode may temporarily apply to the corresponding PUSCH transmission only or may continuously apply to a next PUSCH transmission.

In particular, if a previous PUSCH and a new PUSCH exist in the same UL subframe, as a channel status is regarded as getting better, it is able to force a previously configured subframe bundling size to be restricted. The restriction of the subframe bundling size may be independently applicable to each of a previous PUSCH transmission and a new PUSCH transmission. For instance, if a priority is given to a new PUSCH, it may be able to reduce a bundling size for a previous PUSCH in order to prevent the new PUSCH from overlapping with the previous PUSCH. Such operation may be construed as dropping or stopping the previous PUSCH transmission to prevent two PUSCH transmissions from overlapping with each other by maintaining the subframe bundling size intact. On the other hand, it may be able to reduce a subframe bundling size for the new PUSCH transmission.

Moreover, in case that PUSCHs are scheduled to overlap with each other, as a channel status is regarded as getting better, a subframe bundling mode may be stopped. The stop of the subframe bundling mode may be temporarily applied to the corresponding PUSCH only or may be continuously applied to a following PUSCH after the corresponding PUSCH. For clarity, if a subframe bundling mode is temporarily stopped for a corresponding PUSCH only, it may correspond to a case that the subframe bundling mode is disabled. If a subframe bundling mode keeps being stopped after a corresponding PUSCH, it may correspond to a case that the subframe bundling mode is deactivated. Yet, the former case and the latter case may be interchangeably usable unless special discrimination is made.

Although the methods 1 to 3 are separately described for clarity, they are usable selectively or in a manner of being combined with one another. For instance, the methods 1 to 3 may be used selectively or in a manner of being combined with one another in accordance with a PUSCH transmission situation or scenario.

The user equipment operations according to the above-described methods 1 to 3 may be defined in advance or signaled. Such user equipment operation can be enabled or disabled through a higher layer signaling.

In the following description, an embodiment of the present invention is explained in detail with reference to the accompanying drawings. The items exemplarily shown in the drawings may be available by being combined with one another.

FIGS. 7 to 10 show examples of performing a subframe bundling in case of a bundling size set to 2 according to one embodiment of the present invention. In FIGS. 7 to 10, assume that a UL grant PDCCH A is transmitted in a DL subframe #n if a bundling size is 2. And, assume that a new UL grant PDCCH B is transmitted in a DL subframe #(n+1).

Figure 7:
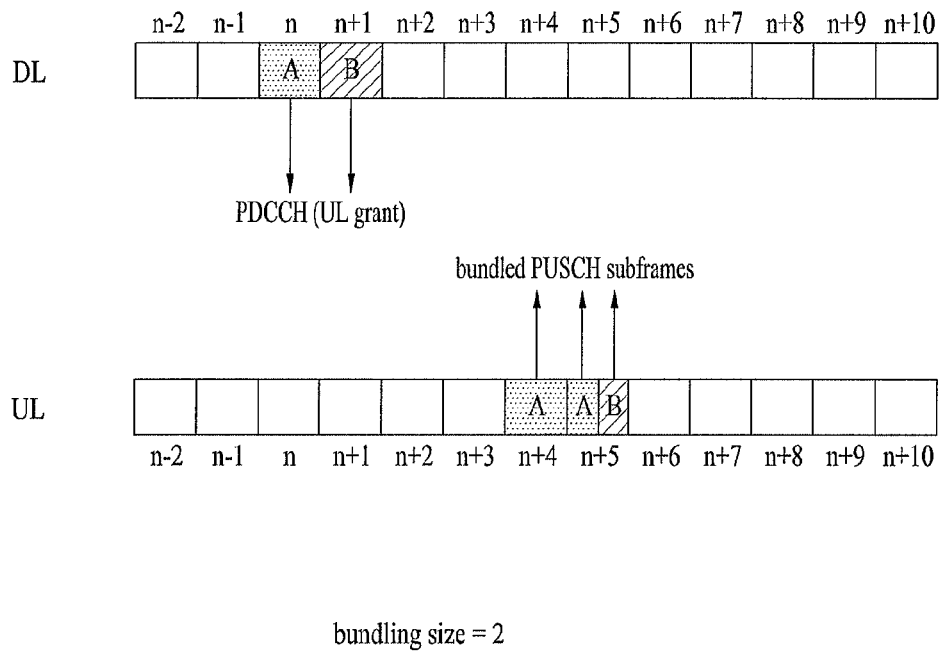
FIGS. 7 to 10 show examples of performing a subframe bundling in case of a bundling size set to 2 according to one embodiment of the present invention.

Referring to FIG. 7, PUSCH (A) for a UL grant PDCCH A is bundled in a UL subframe #(n+4) and a UL subframe #(n+5). Yet, a PUSCH (B) for a UL grant PDCCH B is transmitted in a UL subframe #(n+5) only but is not bundled any more. The present example means that, even if a subframe bundling mode is set by a higher layer signaling, a physical layer is able to activate or deactivate the operation if necessary. If a subframe bundling mode is continuously disabled by a UL grant PDCCH B, a method of reactivating the subframe bundling mode is necessary. To this end, for example, it may be able to perform a separate signaling (e.g., RRC signaling) to activate the subframe bundling mode. For another example, if a transmission interval of a UL grant PDCCH or a corresponding value corresponds to a bundling size (i.e., 2 DL subframe intervals), a subframe bundling mode is regarded as activated autonomously. On the other hand, the subframe bundling mode may be regarded as temporarily stopped (i.e., disabled) for PUSCH (B) only by a UL grant PDCCH B.

Referring to FIG. 7, a PUSCH (A) for a UL grant PDCCH A and a new PUSCH (B) for a UL grant PDCCH B are transmitted together in a UL subframe #(n+5). In this case, the two PUSCHs may be transmitted using PUSCH resources of their own, respectively.

Figure 8:
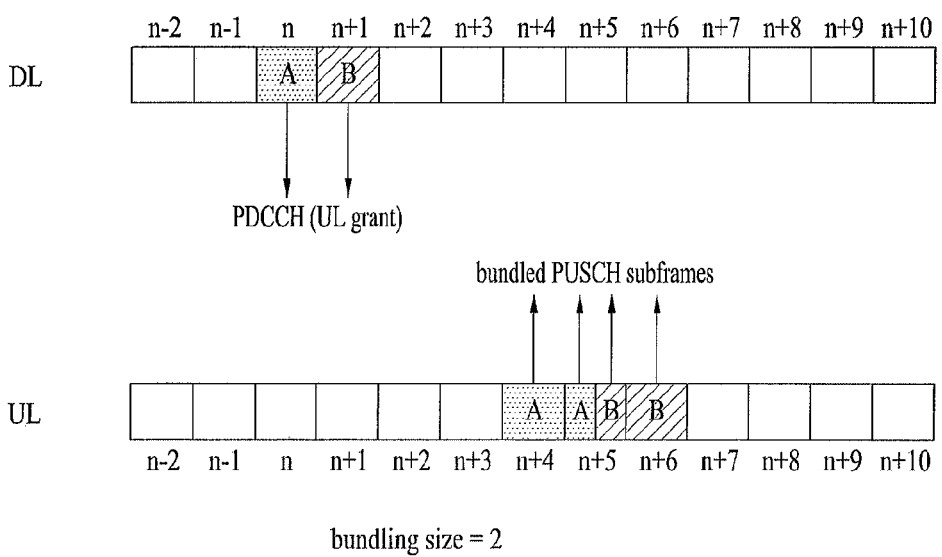

Referring to FIG. 8, a PUSCH (A) for a UL grant PDCCH A is bundled in a UL subframe #(n+4) and a UL subframe #(n+5). And, a PUSCH (B) for a UL grant PDCCH B is bundled in the UL subframe #(n+5) and a UL subframe #(n+6) as well. In particular, a bundling mode for the PUSCH (B) is effectively maintained. In this case, the subframe bundling may be regarded as deactivated or disabled for a transmission next to the UL grant PDCCH B (or PUSCH (B)).

Figure 9:
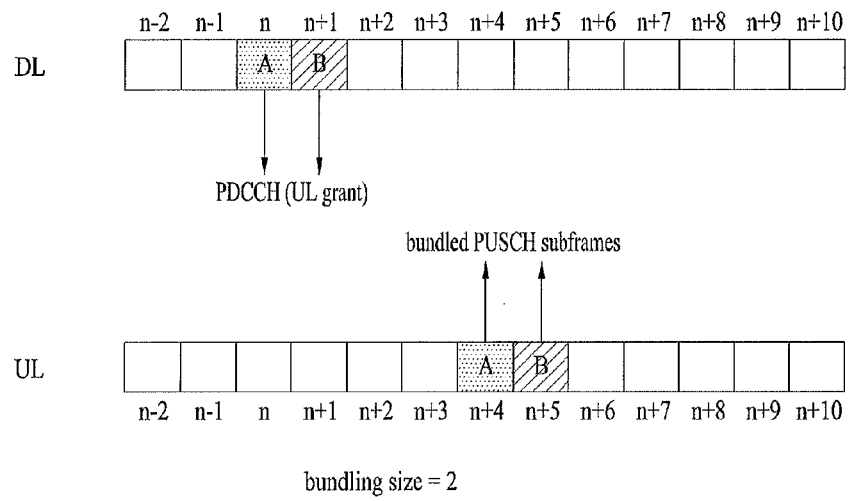

Referring to FIG. 9, a PUSCH (A) for a UL grant PDCCH A is transmitted once in a UL subframe #(n+4) only. And, a PUSCH (B) for a UL grant PDCCH B is transmitted once in a UL subframe #(n+5) only. In particular, if a new PUSCH transmission is necessary in the course of a subframe bundling, the bundling of the PUSCH (A) and the bundling of the PUSCH (B) are respectively stopped. In other words, if an interval between a DL subframe, in which the UL grant PDCCH A is received, and a DL subframe, in which the UL grant PDCCH B is received, or a corresponding value is smaller than a bundling size, the PUSCH subframe bundling configuration is changed. The subframe bundling stop may be used as the meaning of deactivation applied continuously thereafter or the meaning of 'disable (i.e., temporary stop of the subframe bundling)' limited to this time only. The example shown in FIG. 9 may mean that the PUSCH (A and B) bundling is performed on a portion (e.g., 1 subframe) of the whole subframes (e.g., 0.2 subframes). Moreover, according to the example shown in FIG. 9, although the bundling mode for the PUSCH (A) is maintained intact, the PUSCH (A) transmission is abandoned in the UL subframe #(n+5) due to a prescribed reason and a bundling size of the PUSCH (B) is reduced only.

Figure 10:
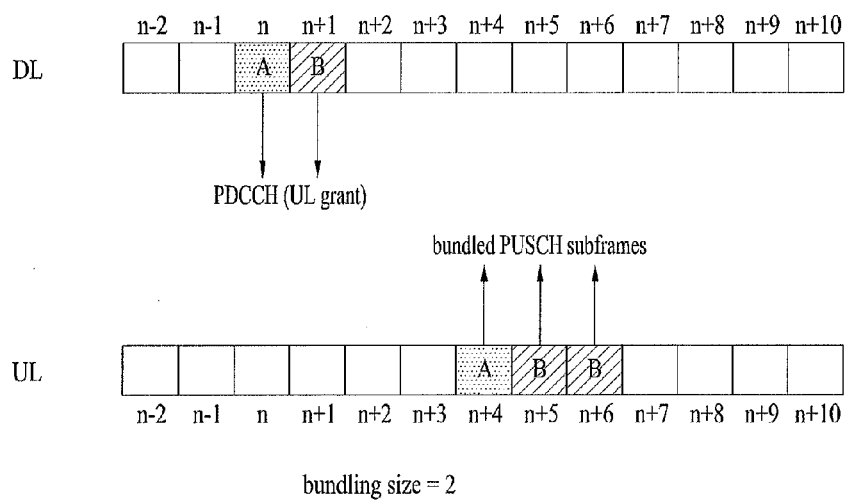

Referring to FIG. 10, a PUSCH (A) for a UL grant PDCCH A is transmitted in a UL subframe #(n+4) once only. Yet, a PUSCH (B) for a UL grant PDCCH B is bundled in a UL subframe #(n+5) and a UL subframe #(n+6). In particular, for example, a subframe bundling for the PUSCH (A) is stopped temporarily or once, while a subframe bundling is applied to the PUSCH (B) in accordance with a previous configuration. This means that the new PUSCH (B) is prioritized. In this case, if a transmission of the previous PUSCH (A) (UL subframe #(n+5)) is abandoned, an initial transmission of the new bundled PUSCH (B) (UL subframe #(n+5)) may be transmitted using a resource of the previous PUSCH (A). Through this, a user equipment is able to send a confirmation, which indicates that a base station has made the PUSCH overlapping schedule, to the base station. In the example shown in FIG. 10, the PUSCH (A) bundling is performed in some (e.g., 1 subframe) of the whole bundled subframes (e.g., 2 subframes) and the PUSCH (B) bundling is performed in the whole bundled subframes. This may be construed as a subframe bundling size for the PUSCH (A) is reduced.

FIGS. 11 to 16 show examples of performing a subframe bundling in case of a bundling size set to 3 according to one embodiment of the present invention. In FIGS. 11 to 16, assume that a UL grant PDCCH A is transmitted in a DL subframe #n if a bundling size is 3. And, assume that a new UL grant PDCCH B is transmitted in a DL subframe #(n+2). Optionally, the UL grant PDCCH B may be transmitted in a DL subframe #(n+1) [not shown in the drawings].

Figure 11:
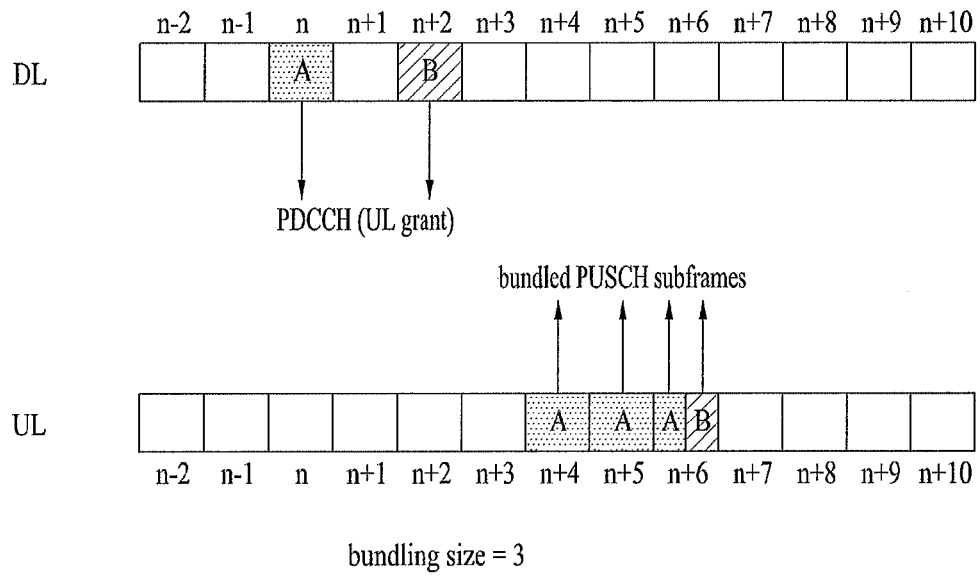
FIGS. 11 to 16 show examples of performing a subframe bundling in case of a bundling size set to 3 according to one embodiment of the present invention.

Referring to FIG. 11, a PUSCH (A) for a UL grant PDCCH A is bundled in UL subframes #(n+4), #(n+5) and #(n+6). A PUSCH (B) for a UL grant PDCCH B is transmitted in the UL subframe #(n+6) only and is not bundled any more. In particular, a subframe bundling mode may be continuously deactivated or temporarily disabled by the new UL grant PDCCH B. Since FIG. 11 is similar to FIG. 7 except that the bundling size is 3, its details shall refer to those of FIG. 7.

Figure 12:
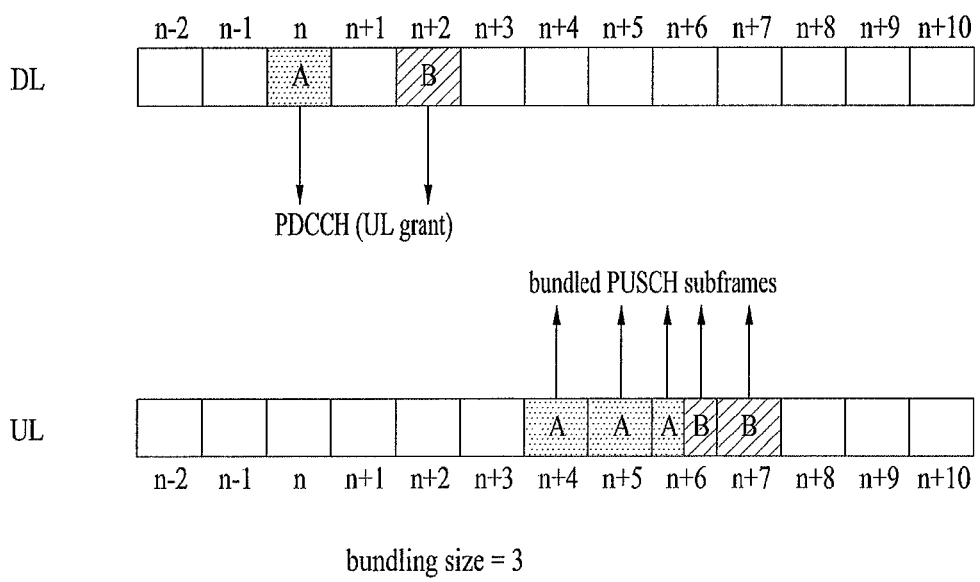

Referring to FIG. 12, a PUSCH (A) for a UL grant PDCCH A is bundled in UL subframes #(n+4), #(n+5) and #(n+6). Yet, a PUSCH (B) for a UL grant PDCCH B is bundled in the UL subframe #(n+6) and a UL subframe #(n+7). In particular, a bundling size for the new PUSCH (B) transmission is reduced into 2 from 3. In more particular, the present example means that the subframe bundling size configured by a higher layer signaling may be changed by a physical layer if necessary. The reduction of the bundling size may be temporarily applicable to the PUSCH (A) and PUSCH (B) only. And, the reduction of the bundling size may be continuously applicable in a subsequent process. If the bundling size is reduced, a separate signaling (e.g., RRC signaling) may be necessary to enable the bundling size to return to its original value. For another example, if a transmission interval of the UL grant PDCCH corresponds to a preset bundling size (i.e., 3 DL subframe intervals), the bundling size may be regarded as returning to 3 from 2 autonomously.

Figure 13:
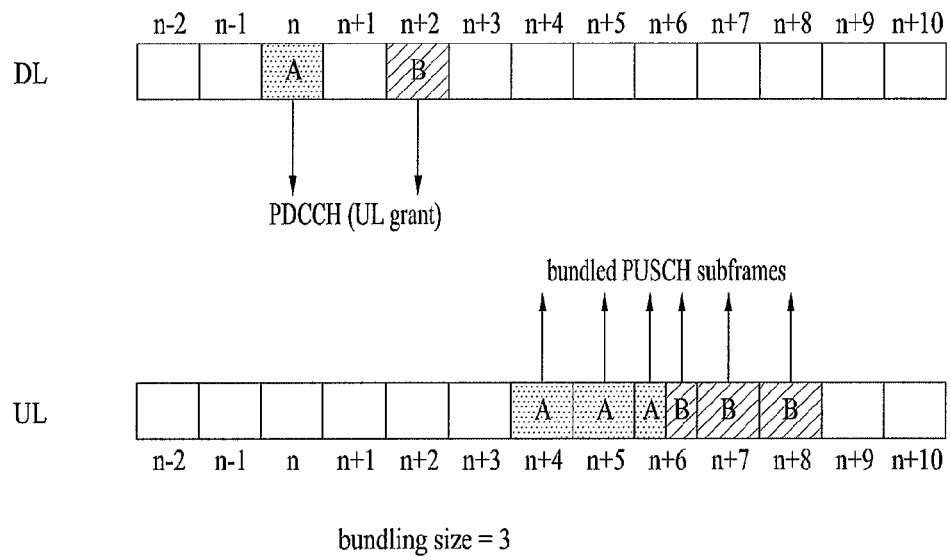

Referring to FIG. 13, a PUSCH (A) for a UL grant PDCCH A is bundled in UL subframes #(n+4), #(n+5) and #(n+6). Similarly, a PUSCH (B) for a UL grant PDCCH B is bundled in the UL subframe #(n+6), a UL subframe #(n+7) and a UL subframe #(n+8). In particular, a subframe bundling mode is effectively maintained for the PUSCH (B). In this case, the subframe bundling for a transmission next to the UL grant PDCCH B may be deactivated or disabled. FIG. 13 is almost identical to FIG. 8 except that the bundling size is 3.

Figure 14:
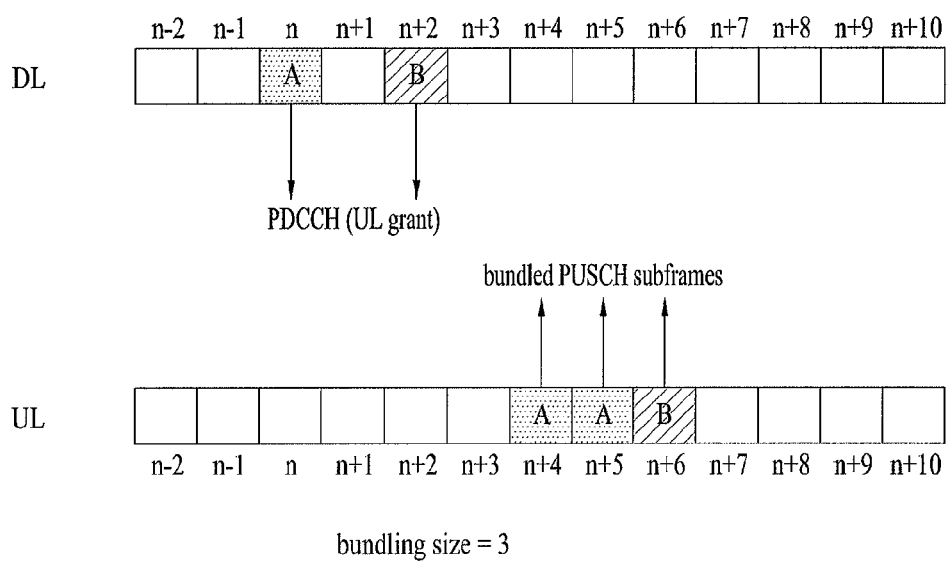

Referring to FIG. 14, a PUSCH (A) of a UL grant PDCCH A is bundled in a UL subframes #(n+4) and a UL subframe #(n+5). Yet, a PUSCH (B) for a UL grant PDCCH B is transmitted in the UL subframe #(n+6) only and is not bundled any more. In particular, the PUSCH (A) is bundled prescribed times smaller than a designated count due to the bundling size reduction or the abandonment of the PUSCH (A) transmission in the UL subframe #(n+6). In case of the PUSCH (A), the bundling is performed thereon as it is. Yet, in case of the PUSCH (B), the bundling is not performed thereon any more or temporarily. In particular, the bundling is deactivated or disabled for the PUSCH (B). FIG. 14 is almost identical to FIG. 9 except that the bundling size is 3.

Figure 15:
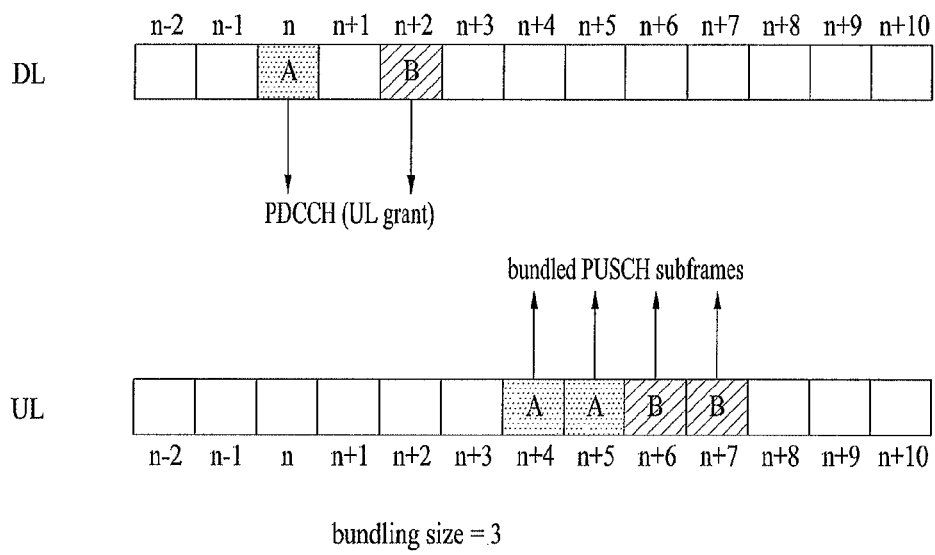

Referring to FIG. 15, a PUSCH (A) for a UL grant PDCCH A is bundled in a UL subframes #(n+4) and a UL subframe #(n+5). Similarly, a PUSCH (B) for a UL grant PDCCH B is bundled in a UL subframe #(n+6) and a UL subframe #(n+7). FIG. 15 shows one example of a case, that a bundling size for the PUSCH (A) and PUSCH (B) transmission is reduced into 2 from 3. In particular, the present example means that the subframe bundling size configured by a higher layer signaling may be changed by a physical layer if necessary. The reduction of the bundling size may be temporarily applicable to the PUSCH (A) and PUSCH (B) only. And, the reduction of the bundling size may be continuously applicable in a subsequent process. If the bundling size is reduced, a separate signaling (e.g., RRC signaling) may be necessary to enable the bundling size to return to its original value. For another example, if a transmission interval of the UL grant PDCCH corresponds to a preset bundling size (i.e., 3 DL subframe intervals), the bundling size may be regarded as returning to 3 from 2 autonomously.

Moreover, according to the example shown in FIG. 15, the bundling mode for the PUSCH (A) is maintained as it is. And, the PUSCH (A) transmission in the UL subframe #(n+6) may be regarded as abandoned due to a prescribed reason. In particular, the bundling size may be regarded as reduced for the PUSCH (B) only. FIG. 15 is almost identical to FIG. 9 except that the bundling size is 3.

Figure 16:
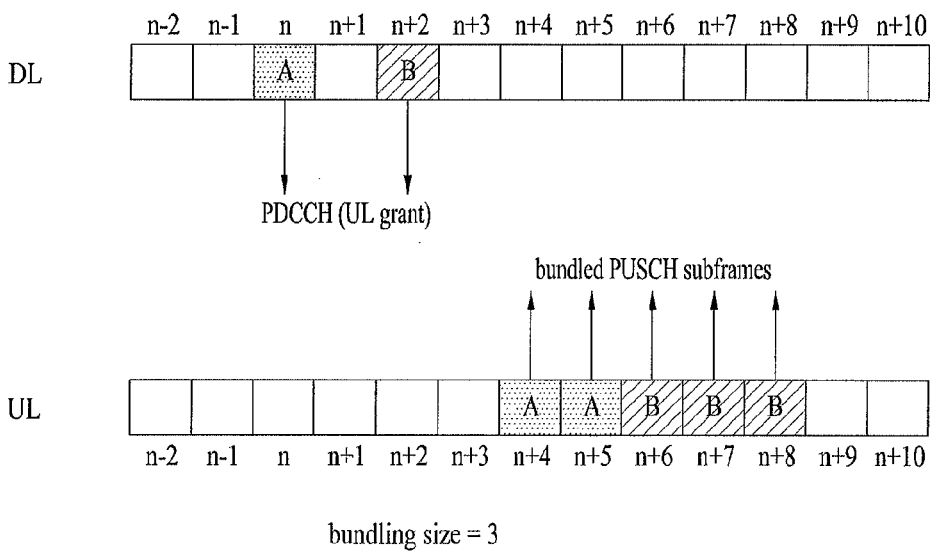

Referring to FIG. 16, a PUSCH (A) for a UL grant PDCCH A is transmitted in a UL subframe #(n+4) and a UL subframe #(n+5). Yet, a PUSCH (B) for a UL grant PDCCH B is bundled in a UL subframe #(n+6), a UL subframe #(n+7) and a UL subframe #(n+8). In particular, for example, a subframe bundling for the PUSCH (A) is stopped temporarily or once, while a subframe bundling is applied to the PUSCH (B) in accordance with a previous configuration. The present example means that the new PUSCH (B) is prioritized. FIG. 16 is almost identical to FIG. 10 except that the bundling size is 4.

FIGS. 17 to 26 show examples of performing a subframe bundling according to one embodiment of the present invention.

In FIGS. 17 to 23, assume that a UL grant PDCCH A is transmitted in a DL subframe #n if a bundling size is 4. And, assume that a new UL grant PDCCH B is transmitted in a DL subframe #(n+3). Optionally, the UL grant PDCCH B may be transmitted in a DL subframe #(n+1) and a UL subframe #(n+2) as well [not shown in the drawings].

Figure 17:
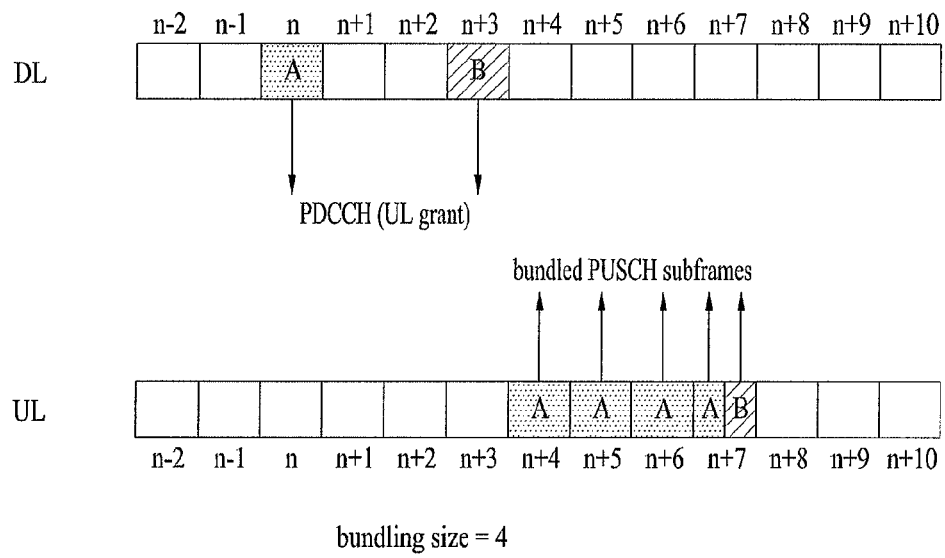
FIGS. 17 to 25 show examples of performing a subframe bundling in case of a bundling size set to 4 according to one embodiment of the present invention.

Referring to FIG. 17, a PUSCH (A) for a UL grant PDCCH A is bundled in a UL subframe #(n+4), a UL subframe #(n+5), a UL subframe #(n+6) and a UL subframe #(n+7). Yet, a PUSCH (B) for a UL grant PDCCH B is transmitted in the UL subframe #(n+7) only and is not bundled any more. In particular, a subframe bundling mode may be continuously deactivated or temporarily disabled by the new UL grant PDCCH B. FIG. 17 is similar to FIG. 7 and FIG. 11 except that the bundling size is 4.

Figure 18:
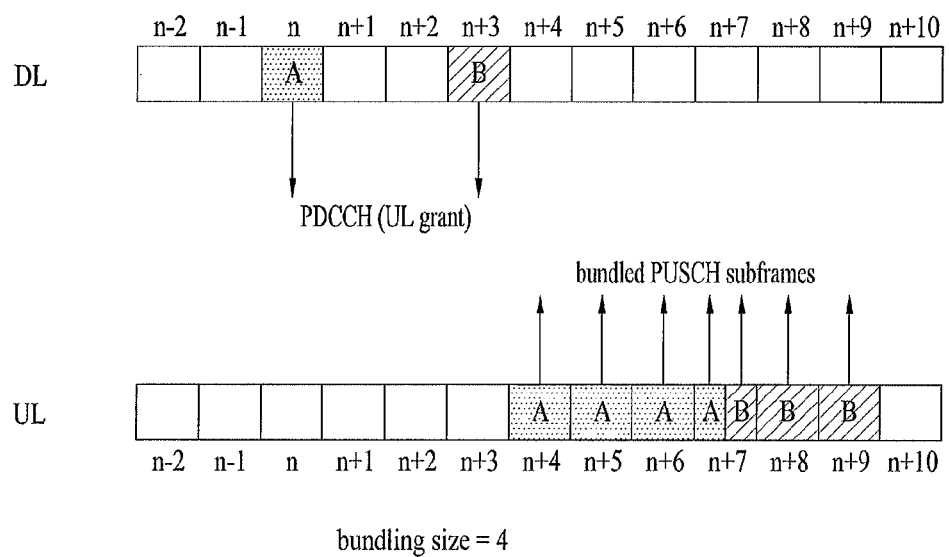

Referring to FIG. 18, ACK/NACK (A) for a UL grant PDCCH A is bundled in UL subframes #(n+4), #(n+5), #(n+6) and #(n+7). Yet, a PUSCH (B) for a UL grant PDCCH B is bundled in the UL subframe #(n+7), a UL subframe #(n+8) and a UL subframe #(n+9). In particular, a bundling size for the PUSCH (B) for the new UL grant PDCCH B is reduced into 3 from 4 for example. FIG. 18 is almost identical to FIG. 12 except that the bundling size is 4.

Figure 19:
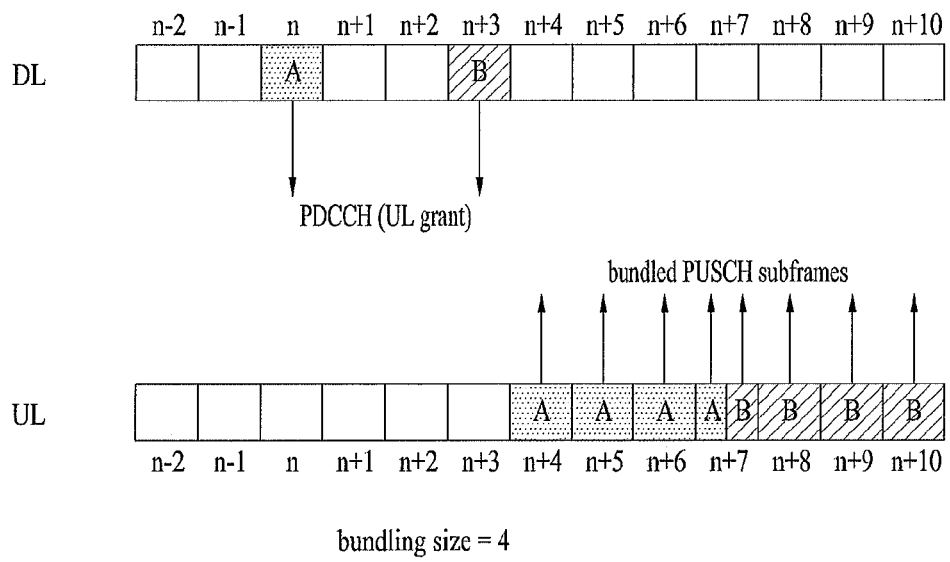

Referring to FIG. 19, a PUSCH (A) for a UL grant PDCCH A is bundled in UL subframes #(n+4), #(n+5), #(n+6) and #(n+7). Similarly, a PUSCH (B) for a UL grant PDCCH B is bundled in the UL subframe #(n+7), a UL subframe #(n+8), a UL subframe #(n+9) and a UL subframe #(n+10). In particular, a subframe bundling mode is effectively maintained for the PUSCH (B). In this case, the subframe bundling for a transmission next to the UL grant PDCCH B (or the PUSCH (B)) may be deactivated or disabled. FIG. 19 is almost identical to FIG. 8 and FIG. 13 except that the bundling size is 4.

FIG. 19 is further described in detail as follows. First of all, in case that the subframe bundling is performed on the UL grant PDCCH A transmitted in a DL subframe #n, since the UL grant PDCCH is not transmitted in a DL subframe #(n+1) and a DL subframe #(n+2), it may be unnecessary for a user equipment to decode the UL grant PDCCH. Hence, although any UL grant PDCCH is transmitted in the DL subframe #(n+1) and the DL subframe #(n+2), the user equipment does not transmit a PUSCH in response to the transmitted UL grant PDCCH. Meanwhile, in case that the user equipment receives a UL grant PDCCH in a DL subframe #(n+3), it should transmit a PUSCH in a subframe #(n+7). Although the subframe #(n+7) is originally scheduled to transmit a PUSCH for a UL grant PDCCH A, the user equipment ignores such schedule and transmits a PUSCH for a UL grant PDCCH B.

Figure 20:
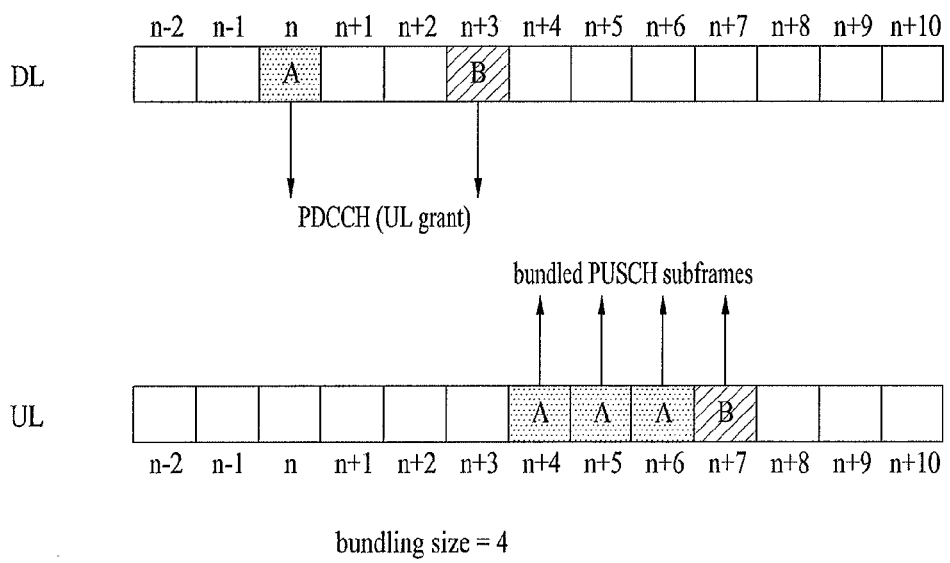

Referring to FIG. 20, a PUSCH (A) for a UL grant PDCCH A is bundled in a UL subframe #(n+4), a UL subframe #(n+5) and a UL subframe #(n+6). Yet, a PUSCH (B) for a UL grant PDCCH B is transmitted in a UL subframe #(n+7) only and is not bundled any more. In particular, a bundling count of the PUSCH (A) is reduced by 1 and the PUSCH (B) is transmitted instead. Assume that a user equipment is able to recognize the situation shown in FIG. 20. When the user equipment confronts such situation, the user equipment is able to perform a series of procedures for selecting to transmit PUSCH (B) instead of PUSCH (A) from a UL subframe required for two PUSCH transmissions. FIG. 20 is almost identical to FIG. 9 and FIG. 14 except that the bundling size is 4.

Figure 21:
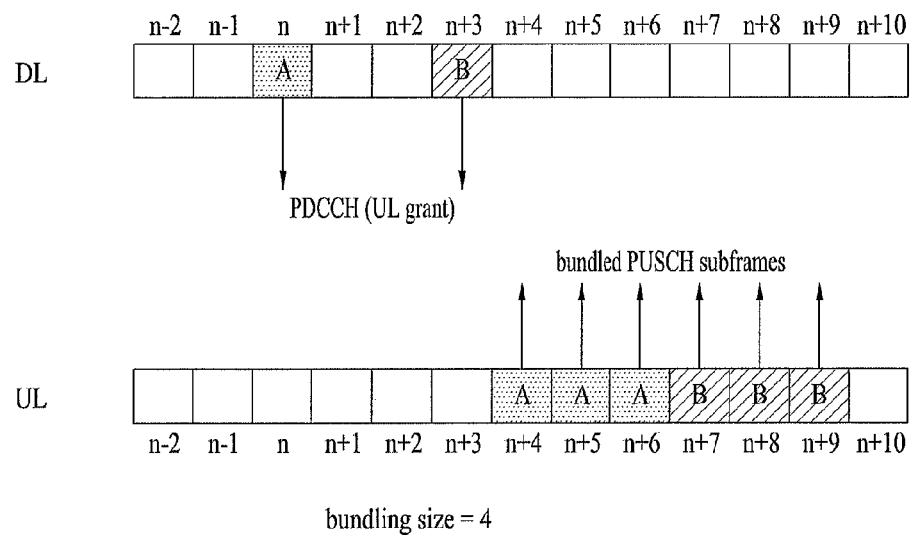

Referring to FIG. 21, a PUSCH (A) for a UL grant PDCCH A is bundled in a UL subframe #(n+4), a UL subframe #(n+5) and a UL subframe #(n+6). Similarly, a PUSCH (B) for a UL grant PDCCH B is bundled in a UL subframe #(n+7), a UL subframe #(n+8) and a UL subframe #(n+9). FIG. 21 may mean the following. First of all, although a bundling size for the PUSCH (A) is maintained as it is, as the PUSCH (A) transmission in the UL subframe #(n+7) is abandoned due to a prescribed reason, bundling is performed prescribed times smaller than a designated count. In particular, the bundling size may be regarded as reduced for the PUSCH (B) only. FIG. 21 is almost identical to FIG. 9 and FIG. 15 except that the bundling size is 4.

Figure 22:
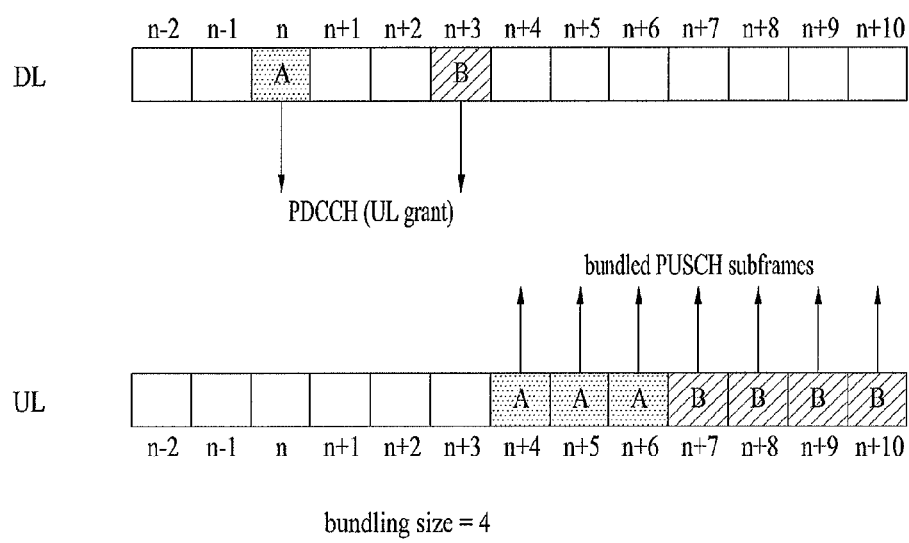

FIG. 22 shows one example of a case that a new PUSCH (B) is prioritized. Referring to FIG. 22, a PUSCH (A) for a UL grant PDCCH A is bundled in a UL subframe #(n+4), a UL subframe #(n+5) and a UL subframe #(n+6). Yet, a PUSCH (B) for a UL grant PDCCH B is bundled in a UL subframe #(n+7), a UL subframe #(n+8), a UL subframe #(n+9) and a UL subframe #(n+10). In particular, the bundling for the PUSCH (A) is stopped temporarily or once only but the bundling is applied to the PUSCH (B) according to a previous setting, for example. To this end, in a UL subframe scheduled to perform both a PUSCH (A) transmission and a PUSCH (B) transmission, the PUSCH (A) transmission is dropped by a user equipment. FIG. 22 is almost identical to FIG. 16 and FIG. 10 except that the bundling size is 4.

Figure 23:
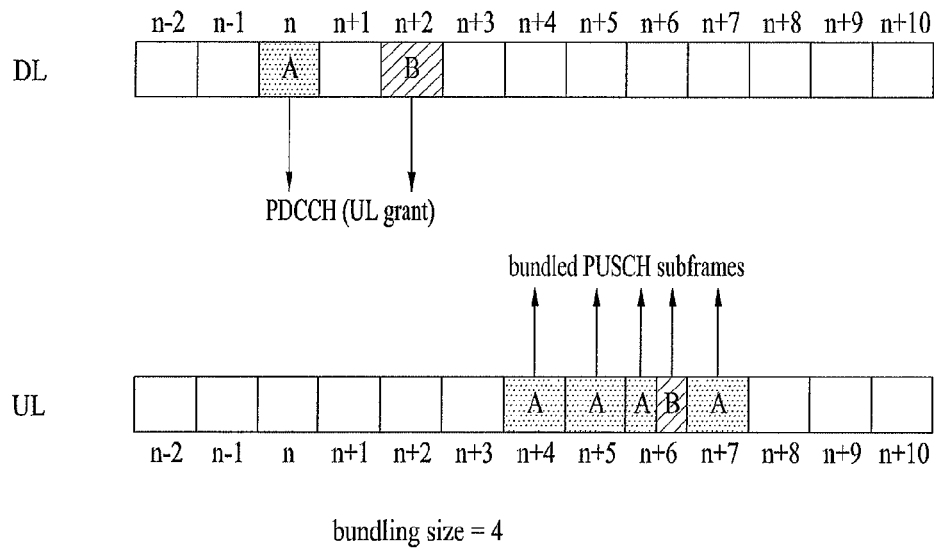
Figure 24:
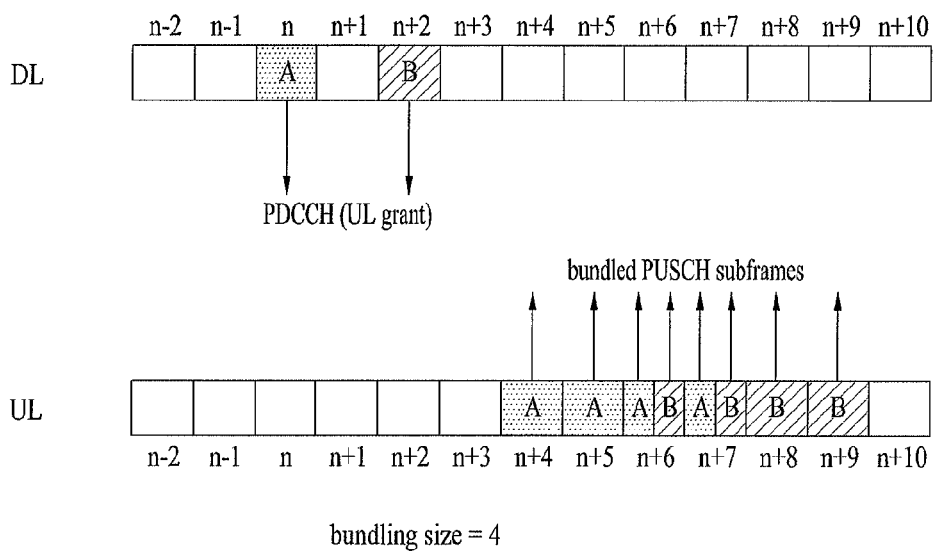

In FIG. 23 and FIG. 24, assume that a UL grant PDCCH A is transmitted in a DL subframe #n if a bundling size is 4. And, assume that a new UL grant PDCCH B is transmitted in a DL subframe #(n+2). Optionally, the UL grant PDCCH B may be transmitted in a DL subframe #(n+1) and a UL subframe #(n+3) as well [not shown in the drawings].

FIG. 23 shows one example of advancing a transmission of a PUSCH (B) by maintaining an original configuration of a PUSCH (A) bundling. Referring to FIG. 23, a PUSCH (A) for a UL grant PDCCH A is bundled in a UL subframe #(n+4), a UL subframe #(n+5), a UL subframe #(n+6) and a UL subframe #(n+7). Yet, a PUSCH (B) for a UL grant PDCCH B is transmitted in the UL subframe #(n+6) only and is not repeated any more. In particular, the PUSCH (A) is fully bundled according to a previous configuration but the PUSCH (B) is ended by a 1-time transmission. It may be possible for an operation exemplarily shown to be construed as follows. First of all, if a new UL grant PDCCH transmission arrives, a user equipment interprets it as the meaning of stopping a subframe bundling. In this case, it means that the PUSCH (B) is not bundled temporarily, limitedly or conditionally. The contents of FIG. 23 may be identically applicable to FIG. 7 and FIG. 11.

Referring to FIG. 24, a PUSCH (A) for a UL grant PDCCH A is bundled in a UL subframe #(n+4), a UL subframe #(n+5), a UL subframe #(n+6) and a UL subframe #(n+7). Similarly, a PUSCH (B) for a UL grant PDCCH B is bundled in the UL subframe #(n+6), the UL subframe #(n+7), a UL subframe #(n+8) and a UL subframe #(n+9). In particular, a bundling mode for the PUSCH (B) is maintained effectively. And, a case that PUSCH overlaps across two UL subframes may occur. Meanwhile, a subframe bundling may be deactivated or disabled for a transmission next to that of the UL grant PDCCH B (or PUSCH (B)). FIG. 24 is almost identical to FIG. 8 and FIG. 13 except that the bundling size is 4.

Figure 25:
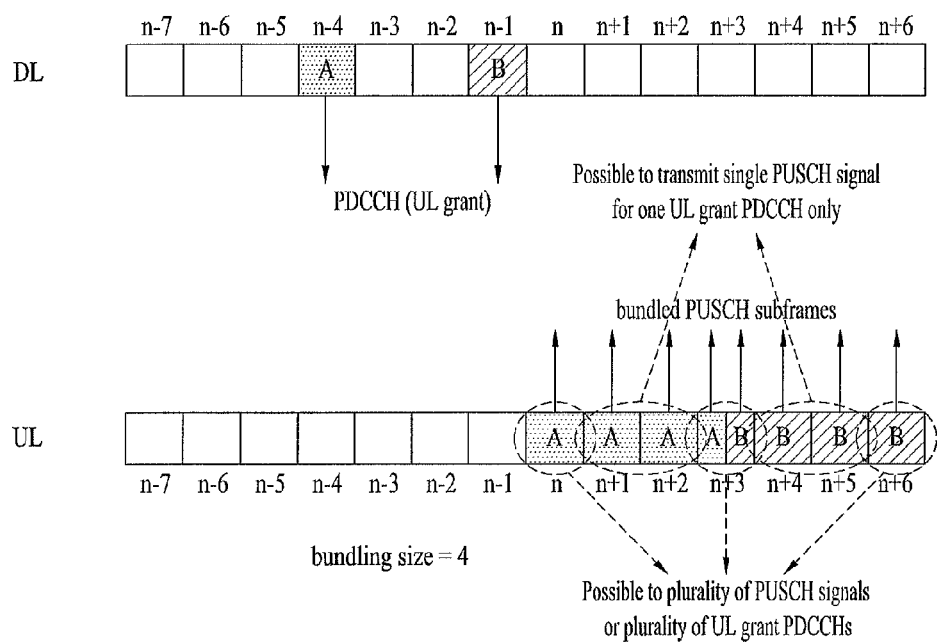

The subframe bundling performing process shown in FIG. 19 is described again with reference to FIG. 25 as follows. In FIG. 25, assume that a UL grant PDCCH A is transmitted in a DL subframe #(n−4) if a bundling size is 4. And, assume that a new UL grant PDCCH B is transmitted in a DL subframe #(n−1).

Referring to FIG. 25, when there is a bundled PUSCH (A) transmission for a UL grant PDCCH A, even if a new UL grant PDCCH transmission (e.g., a case that a UL grant PDCCH B is transmitted in a DL subframe #(n−3) and a DL subframe #(n−2)) is performed, a user equipment does not transmit a corresponding bundled PUSCH (B) unless a last bundled PUSCH (A). On the other hand, in case of a last bundled PUSCH (A) for a previous UL grant PDCCH (i.e., a PUSCH (A) of a UL subframe #(n+3)), if it is a timing of transmitting a PUSCH (B) for a UL grant PDCCH B, both of the bundled PUSCH (A) and a $1^{st}$ bundled PUSCH (B) can be simultaneously transmitted.

Figure 26:
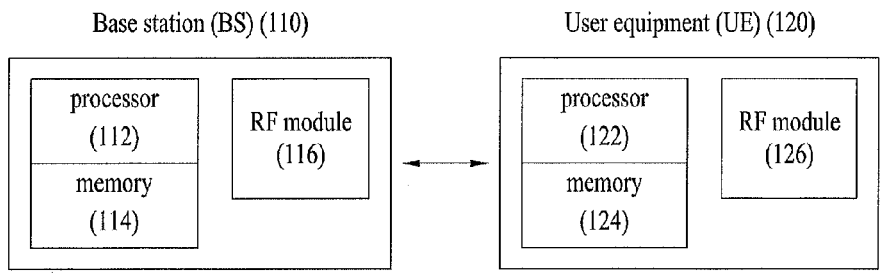
FIG. 26 shows one example of a base station and a user equipment applicable to the present invention.

FIG. 26 shows one example of a base station and a user equipment applicable to the present invention.

Referring to FIG. 26, a wireless communication system includes a base station (BS) 110 and a user equipment (UE) 120. In downlink, a transmitter is a part of the base station 110 and a receiver is a part of the user equipment 120. In uplink, a transmitter is a part of the user equipment 120 and a receiver is a part of the base station 110.

The base station 110 may include a processor 112, a memory 114 and a radio frequency (RF) unit 116. The processor 112 may be configured to implement the procedures and/or methods proposed by the present invention. The memory 114 is connected with the processor 112 to store various kinds informations related to operations of the processor 112. The RF unit 116 is connected with the processor 112 and then transmits and/or receives radio signals. The user equipment 120 may include a processor 122, a memory 124 and a radio frequency (RF) unit 126. The processor 122 may be configured to implement the procedures and/or methods proposed by the present invention. The memory 124 is connected with the processor 122 to store various kinds informations related to operations of the processor 122. The RF unit 126 is connected to the processor 122 and then transmits and/or receives radio signals. The base station 110 and/or the user equipment 120 may have a single antenna or multiple antennas. Moreover, the user equipment 120 may further include at least one of a power management module, a battery, a display, a keypad, an SIM card (optional), a speaker and a microphone.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment may be performed by a base station or other networks (e.g., relay, etc.) except the base station. In this case, a base station can be replaced by such a terminology as a fixed station, a Node B, an eNode B (eNB), an access point and the like. And, a terminal may be replaced by such a terminology as a user equipment (UE), a mobile station (MS), a mobile subscriber station (MSS) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

INDUSTRIAL APPLICABILITY

Accordingly, the present invention is applicable to wireless access systems. In particular, the present invention is applicable to a method of transmitting ACK/NACK in a wireless communication system and apparatus therefor.

What is claimed is:
1. A method of transmitting an uplink signal, which is transmitted by a user equipment in a state that a physical uplink shared channel (PUSCH) subframe bundling mode is set in a wireless communication system, the method comprising:
- receiving a first physical downlink control channel (PDCCH) signal having an uplink grant via a first downlink subframe;
- receiving a second PDCCH signal having an uplink grant via a second downlink subframe;
- if a value corresponding to an interval between the first downlink subframe and the second downlink subframe is smaller than a bundling size set up by a higher layer, transmitting a PUSCH signal corresponding to the second PDCCH signal in at least one contiguous uplink subframe corresponding to a prescribed size,
- wherein the prescribed size is set smaller than the bundling size,
- wherein a PUSCH signal corresponding to the first PDCCH signal and the PUSCH signal corresponding to the second PDCCH signal are simultaneously transmitted in each of one or more uplink subframes among the at least one contiguous uplink subframe, and
- wherein the PUSCH signal corresponding to the first PDCCH signal and the PUSCH signal corresponding to the second PDCCH signal are simultaneously transmitted in each of the one or more uplink subframes, by using respective PUSCH resources in each of the one or more uplink subframes, and by distributing transmission power at a predetermined ratio for the PUSCH signal corresponding to the first PDCCH signal and the PUSCH signal corresponding to the second PDCCH signal; and
- if the value corresponding to the interval between the first downlink subframe and the second downlink subframe is larger than the bundling size, transmitting the PUSCH signal corresponding to the second PDCCH signal in subframes of the bundling size.

2. The method of claim 1, wherein the prescribed size is temporarily applied to a transmission of the PUSCH signal corresponding to the second PDCCH signal only.

3. The method of claim 1, wherein if the value corresponding to the interval between the first downlink subframe and the second downlink subframe is smaller than the bundling size, the PUSCH subframe bundling mode is released.

4. A user equipment, which is configured to transmit an uplink signal in a state that a physical uplink shared channel (PUSCH) subframe bundling mode is set in a wireless communication system, the user equipment comprising:
- a radio frequency (RF) unit; and
- a processor,
- wherein the processor is configured to:
    - receive a first physical downlink control channel (PDCCH) signal having an uplink grant via a first downlink subframe,
    - receive a second PDCCH signal having an uplink grant via a second downlink subframe,
    - if a value corresponding to an interval between the first downlink subframe and the second downlink subframe is smaller than a bundling size set up by a higher layer, transmit a PUSCH signal corresponding to the second PDCCH signal in at least one contiguous uplink subframe corresponding to a prescribed size,
    - wherein the prescribed size is set smaller than the bundling size, and
    - wherein a PUSCH signal corresponding to the first PDCCH signal and the PUSCH signal corresponding to the second PDCCH signal are simultaneously transmitted in each of one or more uplink subframes among the at least one contiguous uplink subframe, and
    - wherein the PUSCH signal corresponding to the first PDCCH signal and the PUSCH signal corresponding to the second PDCCH signal are simultaneously transmitted in each of the one or more uplink subframes, by using respective PUSCH resources in each of the one or more uplink subframes, and by distributing transmission power at a predetermined ratio for the PUSCH signal corresponding to the first PDCCH signal and the PUSCH signal corresponding to the second PDCCH signal, and
    - if the value corresponding to the interval between the first downlink subframe and the second downlink subframe is larger than the bundling size, transmit the PUSCH signal corresponding to the second PDCCH signal in subframes of the bundling size.

5. The user equipment of claim 4, wherein the prescribed size is temporarily applied to a transmission of the PUSCH signal corresponding to the second PDCCH signal only.

6. The user equipment of claim 4, wherein if the value corresponding to the interval between the first downlink subframe and the second downlink subframe is smaller than the bundling size, the PUSCH subframe bundling mode is released.

* * * * *